United States Patent
Clere et al.

(10) Patent No.: US 6,660,241 B2
(45) Date of Patent: Dec. 9, 2003

(54) HIGHLY DELAMINATED HEXAGONAL BORON NITRIDE POWDERS, PROCESS FOR MAKING, AND USES THEREOF

(75) Inventors: Thomas M. Clere, Orchard Park, NY (US); Séverine M. Labouré, Natick, MA (US)

(73) Assignee: Saint-Gobain Ceramics & Plastics, Inc., Worcester, MA (US)

(*) Notice: Subject to any disclaimer, the term of this patent is extended or adjusted under 35 U.S.C. 154(b) by 0 days.

(21) Appl. No.: 09/842,452

(22) Filed: Apr. 26, 2001

(65) Prior Publication Data

US 2002/0006511 A1 Jan. 17, 2002

Related U.S. Application Data

(60) Provisional application No. 60/200,846, filed on May 1, 2000.

(51) Int. Cl.$^7$ .............................. B32B 5/16; B32B 9/00; C01B 21/064
(52) U.S. Cl. .................. 423/290; 428/366; 428/372
(58) Field of Search .................. 428/323, 366, 428/372, 327; 423/290

(56) References Cited

U.S. PATENT DOCUMENTS

| | | | | |
|---|---|---|---|---|
| 4,107,276 A | * | 8/1978 | Schwetz et al. | 423/290 |
| 4,514,370 A | | 4/1985 | Inoue et al. | |
| 4,634,640 A | * | 1/1987 | Hunold et al. | 428/704 |
| 4,731,311 A | | 3/1988 | Susuki et al. | |
| 4,863,881 A | | 9/1989 | Ahrens et al. | |
| 5,011,870 A | | 4/1991 | Peterson | |
| 5,116,589 A | * | 5/1992 | Hoenig | 423/298 |
| 5,194,480 A | | 3/1993 | Block et al. | |
| 5,234,712 A | | 8/1993 | Howard | |
| 5,466,269 A | * | 11/1995 | Corrigan et al. | 51/307 |
| 5,508,110 A | | 4/1996 | Howard | |
| 5,545,473 A | | 8/1996 | Ameen et al. | |
| 5,591,034 A | | 1/1997 | Ameen et al. | |
| 5,593,773 A | * | 1/1997 | McKay et al. | 428/328 |
| 5,601,874 A | | 2/1997 | Howard et al. | |
| 5,681,883 A | | 10/1997 | Hill et al. | |
| 5,738,936 A | | 4/1998 | Hanrahan | |
| 5,854,155 A | | 12/1998 | Kawasaki et al. | |
| 5,898,009 A | | 4/1999 | Shaffer et al. | |
| 5,985,228 A | | 11/1999 | Corrigan et al. | |
| 6,048,511 A | * | 4/2000 | Shaffer et al. | 423/290 |
| 6,110,527 A | * | 8/2000 | Brun et al. | 427/214 |
| 6,284,817 B1 | | 9/2001 | Cross et al. | |
| 6,319,602 B1 | * | 11/2001 | Fauzi et al. | 428/366 |

OTHER PUBLICATIONS

Hagio et al., "Sintering of the Mechanochemically Activated Powders of Hexagonal Boron Nitride," *J. Am. Ceram. Soc.*, 72(8):1482–84 (1989).

Carborundum Boron Nitride Data Sheet, "Cosmetic Grade Boron Nitride Powders" (6/98).

"Silicones & Silicon–Containing Polymers," *Petrarch Systems Silanes and Silicones: Silicon Compounds Register & Review* (1987).

* cited by examiner

*Primary Examiner*—H. Thi Le
(74) *Attorney, Agent, or Firm*—Nixon Peabody LLP

(57) ABSTRACT

The present invention relates to a powder comprising boron nitride particles having an aspect ratio of from about 50 to about 300. The present invention also relates to a method of making delaminated boron nitride powder. This method involves providing boron nitride powder and milling the boron nitride powder in a mixture including a milling media and a milling liquid under conditions effective to produce delaminated boron nitride powder.

27 Claims, 4 Drawing Sheets

  
*FIG. 2A*  *FIG. 2B*  *FIG. 2C*

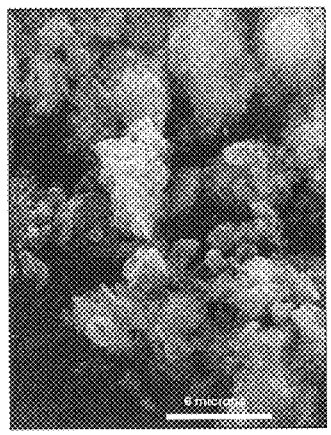 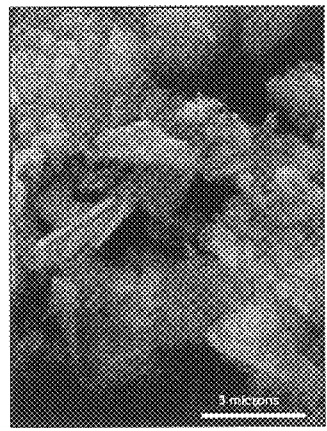 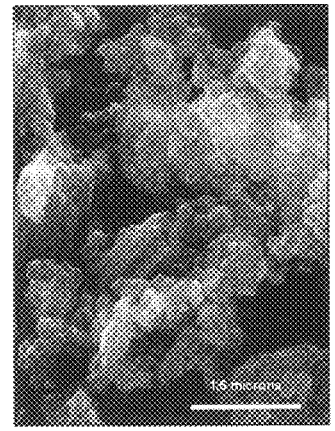
*FIG. 3A*  *FIG. 3B*  *FIG. 3C*

HIGHLY DELAMINATED HEXAGONAL BORON NITRIDE POWDERS, PROCESS FOR MAKING, AND USES THEREOF

This application claims the benefit of U.S. Provisional Patent Application Ser. No. 60/200,846, filed May 1, 2000.

FIELD OF THE INVENTION

The present invention relates to highly delaminated hexagonal boron nitride powders, a process for making such powders, and the use of the resulting powders.

BACKGROUND OF THE INVENTION

Several methods for milling boron nitride, in particular, hexagonal boron nitride ("h-BN") are known in the art. One conventional process for milling h-BN is disclosed in Hagio et al., *J. Am. Cer. Soc.* 72:1482–84 (1989) ("Hagio"). According to Hagio, a virgin h-BN powder (characterized by a particle size of about 10 μm, a surface area of about 5 $m^2/g$, and a thickness of about 100 nm) is milled by grinding with tungsten carbide mortar (WC) in air. The apparent purpose of Hagio's milling operation is to increase the surface area of the h-BN powder, thereby increasing its reactivity. When milled in this manner for 24 hours, the resultant h-BN powder has a lower particle diameter (2 μm), a higher surface area (54 $m^2/g$), and is slightly thinner (71 nm). The data reported by Hagio suggests that the final geometry of the milled powder is not dependent upon the starting powder purity. Although Hagio reports a reduction in the platelet thickness, Hagio's milling operation primarily results in BN particle fracture, thereby reducing the particle diameter, resulting in an increased surface area.

In U.S. Pat. No. 5,063,184 to Tsuyoshi et al. ("Tsuyoshi"), it is reported that high surface area, highly reactive h-BN powders are useful in providing high density, pressureless sintered h-BN components. In each example in Tsuyoshi, the virgin h-BN is milled in either air or nitrogen.

The present invention is directed towards providing an improved milling method for producing h-BN powders.

SUMMARY OF THE INVENTION

The present invention relates to a powder comprising hexagonal boron nitride particles having an aspect ratio of from about 50 to about 300.

The present invention also relates to a method of making delaminated hexagonal boron nitride powder. This method involves providing hexagonal boron nitride powder and milling the hexagonal boron nitride powder in a mixture under conditions effective to produce delaminated hexagonal boron nitride powder having an aspect ratio of from about 50 to about 300.

The method of the present invention produces more highly delaminated, high aspect ratio boron nitride powder. Whereas the dry milling procedures of the prior art increase the surface area of the BN particle essentially by particle fracture (i.e., by reducing the particle diameter), the method of the present invention provides similar increases in surface area but does so by particle delamination (i.e., by reducing particle thickness). The resulting boron nitride powder has a high aspect ratio (a large particle diameter and a small particle thickness) which is useful in certain applications, e.g. as a processing aid for the extrusion of polymers. In particular, the delaminated BN powders of the present invention are more effective at lowering the die wall/polymer interfacial friction during extrusion, leading to a decrease in extrusion pressures and delaying further the onset of gross melt fracture to higher effective shear rates.

BRIEF DESCRIPTION OF THE DRAWINGS

FIGS. 2A–C are scanning electron microscopy ("SEM") photomicrographs of h-BN produced by conventional dry milling procedures.

FIGS. 3A–C are SEM photomicrographs of h-BN produced by conventional dry milling procedures.

DETAILED DESCRIPTION OF THE INVENTION

The present invention relates to a powder comprising hexagonal boron nitride particles having an aspect ratio of from about 50 to about 300. The aspect ratio of a particle is determined by dividing particle diameter by particle thickness.

Figure 1:
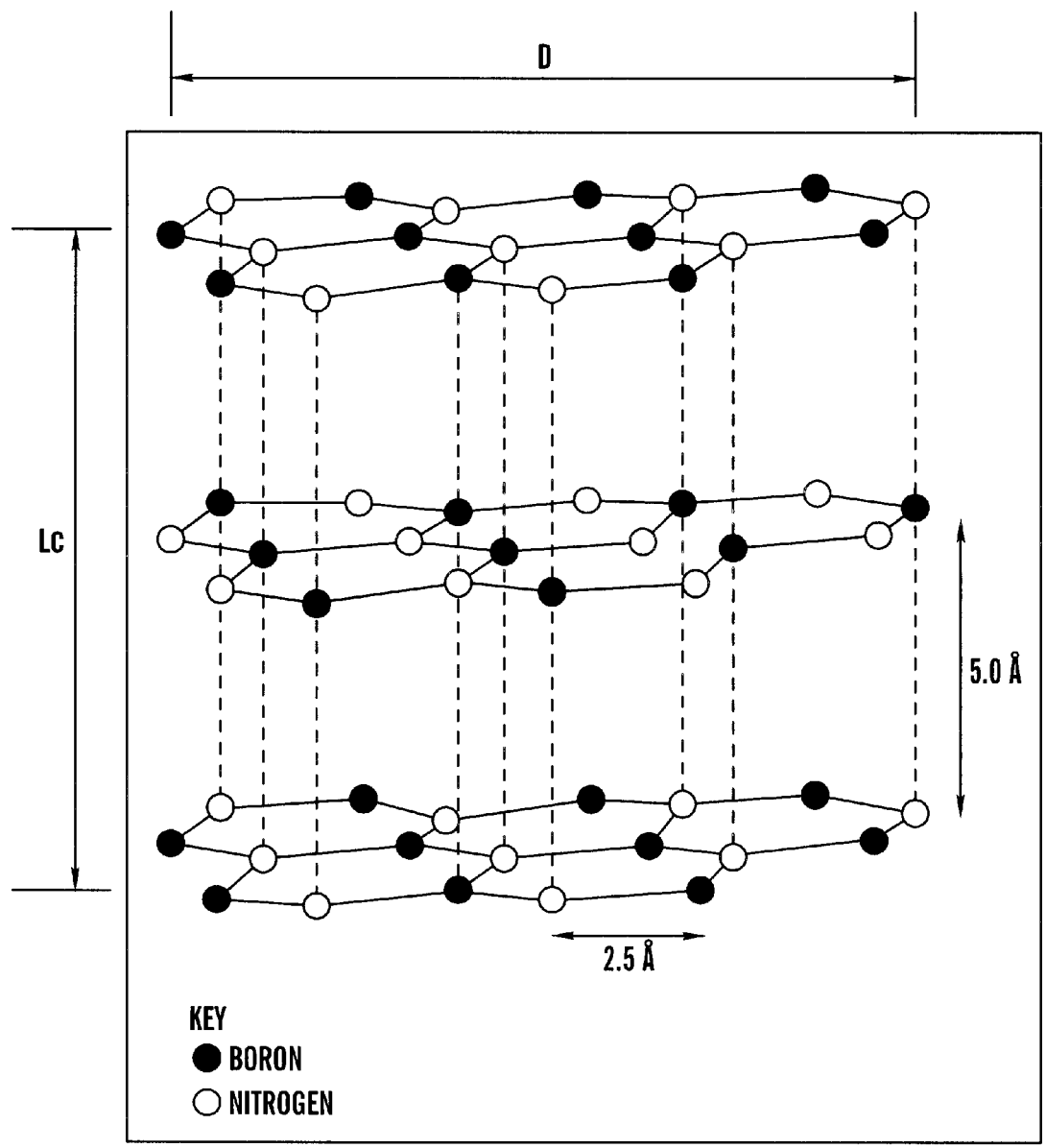
FIG. 1 is a graphic showing the structure of boron nitride, where many of these units make up a BN platelet.

Hexagonal boron nitride is an inert, lubricious ceramic material having a platey hexagonal crystalline structure (similar to that of graphite) ("h-BN"). The well-known anisotropic nature of h-BN can be easily explained by referring to FIG. 1, which shows hexagons of an h-BN particle. The diameter of the h-BN particle platelet is the dimension shown as D in FIG. 1, and is referred to as the a-direction. BN is covalently bonded in the plane of the a-direction. The particle thickness is the dimension shown as Lc, which is perpendicular to diameter and is referred to as the c-direction. Stacked BN hexagons (i.e., in the c-direction) are held together only by Van der Waals forces, which are relatively weak. When a shearing force greater than the weak Van der Waals force is imparted across of the planes of BN hexagons, the weak Van der Waals force is overcome and the planes slide relative to each other. The relative ease with which these planes of BN slide against each other may be one of the reasons for the high lubricity of h-BN.

In one embodiment, the particles have a surface area of at least about 20 $m^2/g$, preferably, at least about 40 $m^2/g$, and, more preferably, at least about 60 $m^2/g$. The specific surface area of the h-BN particle is typically measured by BET adsorption technique, e.g., using a Micromeretics, Flowsorb II 2300 (Norcross, Ga.).

Preferably, the particles have an average diameter of at least about 1 micron, typically between about 1 and 20 μm, more typically between about 4 and 9 μm. As used herein, "particle size" or "diameter" of the h-BN particle platelet is the dimension shown as D in FIG. 1. This is typically measured by scanning electron microscopy and laser scattering techniques using, e.g., a Leeds & Northrup Microtrac X100 (Clearwater, Fla.). In addition, the particle diameter $D_{10}$ is typically at least about 2 μm, more typically at least about 3 μm. As used herein, $D_{10}$ diameter is the diameter at which 10% of the volume of BN particles is smaller than the indicated diameter.

Also, the particles preferably have a thickness of no more than about 50 nm, more preferably, between about 10 and 40 nm, and, most preferably, between about 10 and 20 nm. The particle thickness is the dimension shown as Lc in FIG. 1. This is typically measured by scanning electron microscopy (SEM), calculated indirectly from SEM diameter and surface area data and, if the particle platelets are not multicrystalline, sometimes by x-ray diffraction line broadening technique (see Hagio et al., *J. Am. Cer. Soc.* 72:1482–84 (1989) ("Hagio"), which is hereby incorporated by reference) using, e.g., a SIEMENS Model D500 diffractometer.

The powder of the present invention may be a h-BN powder having a highly ordered hexagonal structure. Such powders have a crystallization index (Hubacek, "Hypothetical Model of Turbostratic Layered Boron Nitride," *J. Cer. Soc. of Japan,* 104:695–98 (1996), which is hereby incorporated by reference) of at least 0.12 (quantification of highly hexagonal h-BN) and, preferably, greater than 0.15. Preferably, the h-BN powder has a crystallinity of about 0.20 to about 0.55, most preferably, from about 0.30 to about 0.55.

Delamination of the h-BN powder of the present invention exposes newly cleaved BN surfaces which are readily oxidized by an oxidizing agent, such as water or oxygen. The oxidizing agent reacts with these new surfaces to produce $B_2O_3$. Although it is believed that the presence of $B_2O_3$ during milling is associated with particle fracture as opposed to particle delamination, as described below, some $B_2O_3$ may be present in the resulting powder as an artifact of the washing and drying techniques used. It may be desirable to adjust the amount of $B_2O_3$ in the resulting powder based on the potential use of the resulting powder. In particular, for cosmetic applications, the h-BN powder of the present invention should have a low weight percentage of $B_2O_3$ to increase the hydroscopic nature of the resulting powder (will not dry the skin). Preferably, for cosmetic applications, the h-BN powder of the present invention has no more than 500 ppm $B_2O_3$, more preferably, from about 0 ppm to about 200 ppm $B_2O_3$. Low $B_2O_3$ content can be achieved by careful washing (such as solvent washing with, e.g., dry alcohol, cold water, etc) and drying (by, e.g., freeze drying).

Alternatively, for use as a processing aid in polymer extrusion, high residual $B_2O_3$ content may enhance particle dispersion within the melt. Thus, preferably, for extrusion applications, the h-BN powder of the present invention has at least 0.5 wt % $B_2O_3$, more preferably, from about 0.5 wt % to about 5 wt % $B_2O_3$. However, for process aids where food contact with the polymer is possible low $B_2O_3$ content, as described above for cosmetic applications, is desirable.

The present invention also relates to a method of making delaminated hexagonal boron nitride powder. This method involves providing hexagonal boron nitride powder and milling the hexagonal boron nitride powder in a milling mixture under conditions effective to produce delaminated hexagonal boron nitride powder having an aspect ratio of from about 50 to about 300.

Preferably, the hexagonal boron nitride powder has a highly ordered hexagonal structure, as described above. Typically, this starting powder is produced by a "high fire" treatment of a raw, essentially turbostratic (amorphous) boron nitride powder (see Hagio et al., "Microstructural Development with Crystallization of Hexagonal Boron Nitride," *J. Mat. Sci. Lett.* 16:795–798 (1997), which is hereby incorporated by reference). In a preferred embodiment, a fine turbostratic BN powder having a crystallization index of less than 0.12 is heat treated in nitrogen at about 1400 to 2300° C. for about 0.5–12 hours. This heat treatment typically acts to produce a more coarse h-BN powder, as the fine, <1 µm crystallites, of turbostratic powder particles become more ordered (crystallized) and larger (>1 micron) during the heat treatment. In typical embodiments, the high fired h-BN powder has a particle size of between 1 and 20 µm, more typically between 4 and 9 µm.

Typically, the virgin h-BN powder comprises between about 5 and 30 wt % of the milling mixture. If substantially less than 10 wt % is used, then production efficiencies decline. If more than 30 wt % is used, then the viscosity of the milling slurry increases, leading to less efficient milling.

Preferably, the milling mixture includes a milling media and a milling liquid.

The milling liquid may be water, methanol, ethanol, propanol, butanol, isomers of low molecular weight alcohols, acetone, and supercritical $CO_2$. In one embodiment, the liquid is any liquid in which $B_2O_3$ is soluble.

Typically, the liquid milling medium comprises between about 70 and 95 wt % of the milling mixture. If less than 70 wt % is used, then the viscosity of the slurry is too high for efficient milling. If more than 95 wt % is used, then there is a sacrifice in productivity and the added burden of removing a larger volume of solvent if a dry powder is desired.

The milling media, according to the present invention, may have an average diameter of from about 1 mm to about 20 mm. Preferably, the milling media is coarse milling media having an average diameter of at least 3 mm. Suitable milling media include zirconia, steel balls, alumina, silicon nitride, silicon carbide, boron carbide, calcium oxide, and magnesium oxide. The size of the milling media can also be used to affect the aspect ratio of the milled material. In particular, milling with fine 1 mm zirconia produces an h-BN powder having a smaller particle diameter than an h-BN powder similarly milled with ⅛" steel balls.

In some embodiments, a dispersant is used in order to lower the viscosity of the milling slurry. Suitable dispersants include Rohm & Haas Duramax 3019, Rhodapex CO/436, Nekal, and the Triton series.

In other embodiments, between about 1 and 20 wt % alcohol is used to assist in the wetting of the h-BN by the water.

Typically, the milling of the h-BN powder is undertaken by a wet milling approach, e.g., in a ball mill, attrition mill, or vibratory mill. If a ball mill is used, then the preferred milling media is steel or other suitably magnetic material to aid in the removal of milling debris by magnetic separation.

In situations in which high aspect ratio h-BN is desired, milling times of between 8 and 48 hours are preferred. If milling is performed for less than 8 hours, there is insufficient delamination. If milling is performed for more than 48 hours, there is the added cost of increased milling time. However, as milling time increases, surface area of the BN particles in the resulting powder increases.

It has been found that, in some embodiments, the temperature of the milling mixture increased significantly during the milling operation. Since the production of $B_2O_3$ increases according to an Arrhenius rate law with temperature, it is possible that this increase in temperature affects the ultimate $B_2O_3$ concentration. Therefore, in embodiments in which low $B_2O_3$ powders are desired, the temperature is maintained at or below about 30° C. Otherwise, the temperature of the milling mixture can be increased.

Although not wishing to be bound by theory, it is believed that the energy imparted by the milling media upon the h-BN particles acts to cleave the h-BN particles at their weakest points, i.e., the planes of BN (in the a-direction), as the stacked hexagonal crystal planes of h-BN are held together by very weak Van der Waals forces. It is believed that the initial phases of the milling operation of Hagio et al., *J. Am. Cer. Soc.* 72:1482–84 (1989) ("Hagio"), which is hereby incorporated by reference, result in some delamination of the BN particles along these planes. However, these initial delaminations expose expansive newly cleaved BN surfaces to air. The oxygen in the air reacts with these new reactive surfaces, thereby producing $B_2O_3$. It appears that this increased $B_2O_3$ content is associated with poorly controlled particle fracture.

The reason as to why increased $B_2O_3$ content promotes particle fracture is not presently clear. While not wishing to be bound by theory, it may be that the rigidity of $B_2O_3$ causes the fracture. Therefore, subsequent milling of the more brittle, $B_2O_3$-laden h-BN particle results substantially in more fracture of the particle (without substantially more delamination), resulting substantially in a reduction in the diameter of the particle (not its thickness).

Alternatively, it may be that the adhesive nature of the boron oxide produced during milling causes h-BN particles to stick together when they contact, forming a sort of rigid agglomerate which essentially locks each h-BN particle into a constrained position. When this agglomerate is eventually caught between the high velocity milling media, the individual platelets constrained within the agglomerate fracture in the c-direction (i.e., normal to the platelet axis).

Alternatively, when milling in the presence of a liquid medium, the liquid may cause the milling media to impact the particles in a manner that promotes shear forces parallel to the BN platelet, thereby promoting delamination.

Nonetheless, it is believed that the conventional dry milling process was self-limiting with respect to its ability to produce a high aspect ratio h-BN structure because the milling process was more by impact than by shear or the production of $B_2O_3$ promoted too much fracture of the platelets.

It is believed that the present invention solves the problem of uncontrolled fracture by using an aqueous medium or any other liquid medium that promotes shear impact between the milling media and the boron nitride or removes $B_2O_3$ from the surface of the BN. Is it further believed that the liquid medium has the effect of removing the $B_2O_3$ from the surface of the delaminated h-BN, thereby allowing more delamination to occur. As it is known that $B_2O_3$ is readily soluble in water, it is believed that, although $B_2O_3$ is produced during the cleavage of the h-BN platelets, a substantial fraction of that $B_2O_3$ is washed away from the h-BN particle by the aqueous medium, thereby leaving a relatively pure delaminated h-BN particle. Milling of these cleaned particles results substantially in more delamination (not fracture), thereby producing a high aspect ratio h-BN powder. Since any $B_2O_3$ produced during subsequent delamination is also washed away by the water, the cycle of delamination/$B_2O_3$ production/$B_2O_3$ washing can continue ad infinitum, thereby resulting in a highly delaminated, ultra-high aspect ratio h-BN powder.

Thus, the selection of the milling liquid should depend upon the desired aspect ratio of the h-BN. For example, if a highly delaminated, high aspect ratio h-BN powder is desired, then the liquid should be one which readily removes $B_2O_3$ from the h-BN particle (to prevent particle fracture and promote delamination). In these cases, the liquid should be one in which $B_2O_3$ is highly soluble (i.e., in which $B_2O_3$ has a solubility of at least 0.01 grams/cc). Given the $B_2O_3$ solubility in the selected milling liquid, a material balance calculation may be used to determine the minimum ratio of milling liquid volume to total $B_2O_3$ to achieve effective removal of $B_2O_3$ from the BN surface. On the other hand, if the mechanism for producing high aspect ratio BN platelets is shear milling, then any liquid of sufficient density can be used in combination with milling media.

Figure 4:
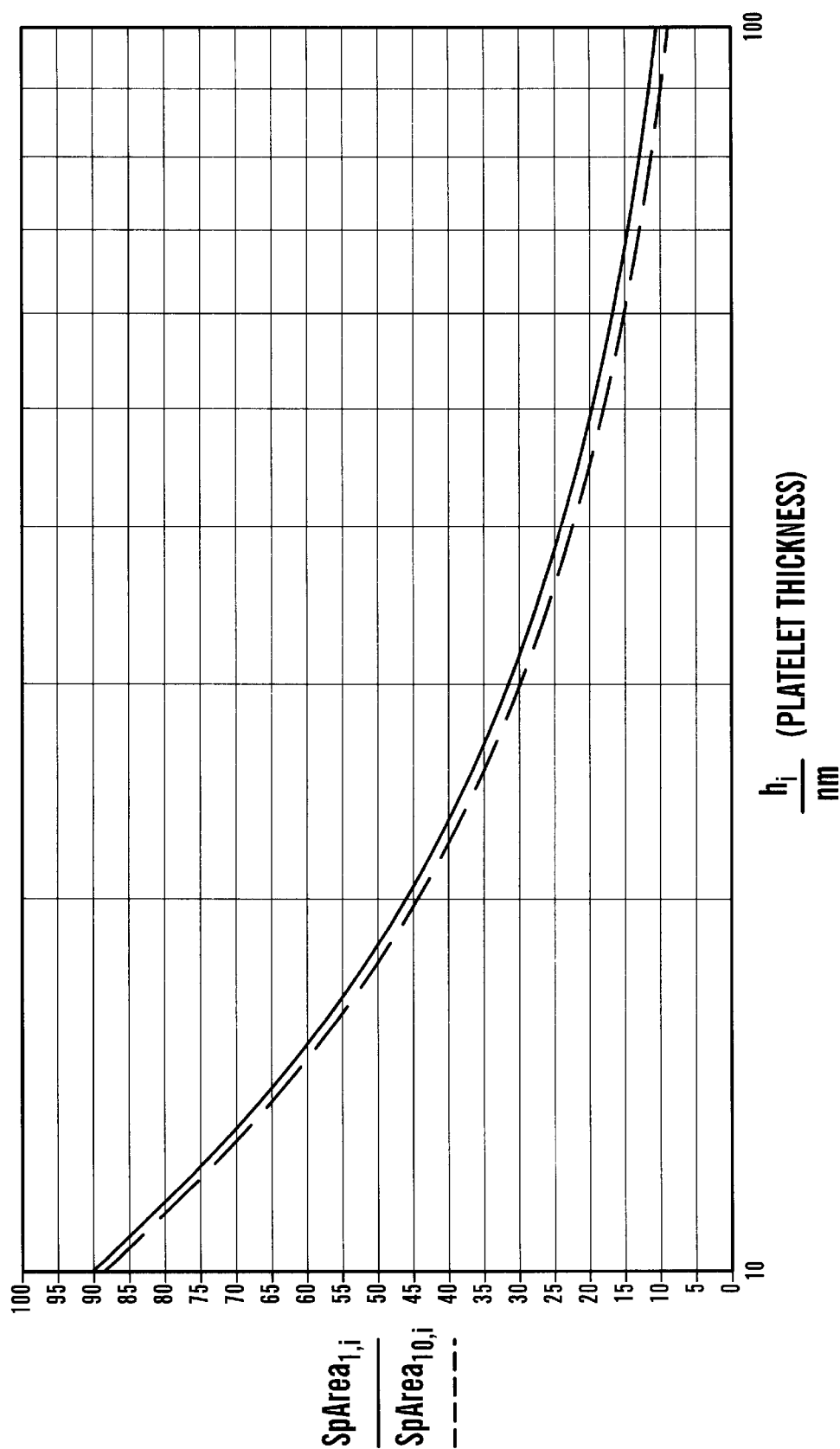
FIG. 4 is a graph showing the specific surface area, particle diameter, and thickness effects of a h-BN powder of the present invention.

It may also be desirable to produce tailored BN particles which are not only very thin, but also somewhat fine, e.g., a powder having thin platelets on the order of BN 1–2 microns in diameter. This may be achieved by combining the milling method of the present invention with dry milling (see, e.g., Hagio et al., *J. Am. Cer. Soc.* 72:1482–84 (1989), which is hereby incorporated by reference) in order to produce both delaminated and fractured h-BN particles. In particular, when the average particle size of the h-BN powder is between about 1 and 10 microns ($\mu$m), a change in the particle size (such as cutting the particle in half across the basal plane, as in FIG. 1) does not effectively change the specific surface area of the particles produced (see FIG. 4). In such instances, a slight reduction in the diameter of the powder provides the benefit of providing about two to four times as many particles (which typically improves the homogeneity and, therefore, the performance of the BN) without losing the benefits of high specific surface area. Therefore, in a preferred embodiment, the method of the present invention further includes dry milling the boron nitride powder under conditions effective to produce delaminated particles having a diameter of from about 1 $\mu$m to about 2.5 $\mu$m. More preferably, the resulting milled h-BN powder has a high aspect ratio and therefore a surface area of at least about 20 $m^2/g$ (preferably at least about 40 $m^2/g$) and a thickness Lc of no more than about 50 nm (preferably no more than about 20 nm), and the particle diameter $D_{10}$ is between about 1 $\mu$m and 2.5 $\mu$m, more preferably between about 1 $\mu$m and 2.25 $\mu$m. Preferably, the dry milling is carried out after milling the boron nitride powder in the milling mixture including milling media and milling liquid ("wet milling"), however, the dry milling could also be carried out before the wet milling step. After dry milling, it may be necessary to carefully wash and dry the resulting powder to remove residual $B_2O_3$.

Another aspect of the present invention is a method for extruding a molten polymer. This method involves blending a powder comprising hexagonal boron nitride particles having an aspect ratio of from about 50 to about 300 with a polymer to form a blend and extruding the blend through an extruder under conditions effective to disperse the boron nitride particles throughout the polymer to form an extrusion product.

In one embodiment, the polymer is a thermoplastic polymer. Examples of thermoplastic polymers which can be used in accordance with the present invention include the polyolefins such as polypropylene, e.g. isotactic polypropylene, linear polyethylenes such as high density polyethylenes (HDPE), linear low density polyethylenes (LLDPE),e.g. having a specific gravity of 0.89 to 0.92. The linear low density polyethylenes made by the INSITE® catalyst technology of Dow Chemical Company and the EXACT® polyethylenes available from Exxon Chemical Company can also be used in the present invention; these resins are generically called mLLDPE. These linear low density polyethylenes are copolymers of ethylene with small proportions of higher alpha monoolefins, e.g. containing 4 to 8 carbon atoms, typically butene or octene. Any of these thermoplastic polymers can be a single polymer or a blend of polymers. Thus, the EXACT® polyethylenes are often a blend of polyethylenes of different molecular weights.

Other thermoplastic polymers include fluoropolymers. Examples of fluoropolymers include the melt-fabricable copolymers of tetrafluoroethylene with one or more fluorinated monomers such as fluoroolefins containing 1 to 8 carbon atoms, such as hexafluoropropylene, and fluoro(vinyl ethers) containing three to ten carbon atoms, such as perfluoro(alkyl vinyl ether), wherein the alkyl group contains 3 to 8 carbon atoms. Specific such monomers include perfluoro(ethyl or propyl vinyl ether). Preferably the fluoropolymer is perfluorinated and has a melt viscosity of $0.5 \times 10^3$ to $5 \times 10^6$ Pa·s at 372° C. These fluoropolymers are perfluorinated, but less than perfluorination can be used. For example, the fluorine content of the fluoropolymer is preferably at least 35 wt %. Examples of such polymers which are not perfluorinated and can be used include tetrafluoroethylene/ethylene and chlorotrifluoroethylene/ethylene copolymers.

From the diversity of the thermoplastic polymers, ranging from polyolefins to fluoropolymers, it is apparent that many other thermoplastic polymers are useful in the present invention. All such thermoplastic polymers have melt viscosities such that they are melt-extrudible.

As is known in the art, the polymer may contain various other additives and modifiers, such as UV stabilizers, antiblocking agents, foaming agents, and fillers (e.g., minerals), to adjust the properties of the polymer.

Preferably, the amount of boron nitride powder in the blend is from about 0–5000 ppm, more preferably, from about 100–1000 ppm, and, most preferably, from about 200–500 ppm.

Blending is carried out in a mixer, such as a v-blender (see Examples below).

Suitable extruders include single screw or twin screw extruders, as are known in the art (see U.S. Pat. No. 5,688,457 to Buckmaster et al., which is hereby incorporated by reference).

Extrusion methods are well known to those of ordinary skill in the art and will not be explained in detail herein (see, e.g., U.S. Pat. No. 2,991,508; U.S. Pat. No. 3,125,547; U.S. Pat. No. 5,688,457 to Buckmaster et al.; Yip et al., ANTEC 1999, Tech. Papers, 45, New York (1999), which are hereby incorporated by reference). Briefly, the boron nitride powder and polymer powder are blended in a mixer. The blend is fed to a hopper, which feeds the extruder. The polymer is melted in the extruder which imparts sufficient shear to disperse the boron nitride particles throughout the melted polymer.

In one embodiment, the method of extrusion of the present invention further includes mixing the extrusion product with virgin polymer to achieve a desired concentration of boron nitride powder in the extrusion product.

In yet another embodiment, the boron nitride powder of the present invention may be combined with other polymer process aids, such as fluoroelastomer process aids (e.g., Dynamar® by Dynecon, Viton® by DuPont Dow Elastomers). Such a combination may provide a synergistic effect.

EXAMPLES

Example 1

Comparative Example

This comparative Example demonstrates the inability of the conventional dry milling procedure to produce high aspect ratio h-BN.

Three milling experiments were performed on a 4-inch, laboratory, high g-force, cyclomill (Dayton Tinker Company, Dayton, Ohio). All experiments began with a high graphitization index (>0.4) powder having a surface area of approximately 8 $m^2/g$ and a mean volume particle platelet diameter of approximately 6 microns. The charge to the mill was 225 grams of boron nitride and ¼" steel media filling the volume of the mill almost half full. The first experiment was performed dry for 30 minutes at 500 rpm. The resultant powder was highly contaminated and difficult to disperse for laser scattering analysis. However, the particle size was found, by SEM, to be submicron, estimated to be about 0.25 microns (see FIGS. 2–3). The surface area was measured by single point technique on a Miromeritics Digisorb Analyzer to be 102 $m^2$/gram. The next two duplicate experiments were done with Stoddard solvent milling medium (CAS # 8052-41-3). The resulting mean volume particle size was measured to be 6.835 and 5.654 microns, respectively. The surface area was correspondingly measured to be 33 and 22.6 $m^2$/gram, respectively. SEM confirmed that the particles were not submicron.

Example 2

Production of a High Aspect Ratio BN Powder.

CTF5, a highly crystalline hexagonal boron nitride powder available from Carborundum Boron Nitride, Amherst, N.Y., was selected as the raw BN material for this example. This high-fired material has a specific surface area of 7.97 $m^2/g$ and a particle size $D_{10}$ of approximately 3.4 μm. Its graphitization index is >0.40.

A milling mixture comprising about 10 wt % CTF5 BN powder, about 90 wt % water, about 0 to 2 wt % polar on non-polar dispersant, and steel milling media was formulated in accordance with the details provided in the Tables that follow.

This milling mixture was then poured into a high energy Sweco Vibro-Energy Grinding Mill Model No. M18L-5 (Florence, Ky.), and milled for between about 4 and 48 hours.

The geometry and purity of the milled powder was then analyzed. The $B_2O_3$ content, specific surface area, particle diameter $D_{10}$, and particle thickness Lc are provided in Tables 1 and 2.

TABLE 1

Results for Sweco milled BN powders.

| Run # | Milling Time (hrs.) | Media Wt. (kg) | Media Dia. (inches) | BN Powder Wt. (grams) | Water Wt. (mls) | Wt % Solids | Vol % Solids | Rohm & Hass Duramax 3019 Dispersant Wt. (grams) | Surface Area ($m^2/g$) | Particle Size Mv[a] (microns) | Acid Wash |
|---|---|---|---|---|---|---|---|---|---|---|---|
| 0 | 0 | 0 | 0 | 0 | 0 | | | 0 | 7.97 | 3.32 | No |
| 1 | 4 | 5 | 0.5 | 125 | 1000 | 11% | 5% | 0 | 12.54 | 3.38 | No |
| 2 | 4 | 5 | 0.5 | 125 | 1000 | 11% | 5% | 0 | 14.53 | 3.32 | Yes |
| 3 | 8 | 5 | 0.5 | 125 | 1000 | 11% | 5% | 0 | 17.13 | 3.33 | No |

TABLE 1-continued

Results for Sweco milled BN powders.

| Run # | Milling Time (hrs.) | Media Wt. (kg) | Media Dia. (inches) | BN Powder Wt. (grams) | Water Wt. (mls) | Wt % Solids | Vol % Solids | Rohm & Hass Duramax 3019 Dispersant Wt. (grams) | Surface Area (m²/g) | Particle Size Mv[a] (microns) | Acid Wash |
|---|---|---|---|---|---|---|---|---|---|---|---|
| 4 | 8 | 5 | 0.5 | 125 | 1000 | 11% | 5% | 20 | 19.61 | 3.13 | Yes |
| 5 | 24 | 4.5 | 0.125 | 60 | 600 | 9% | 4% | 0 | 26.52 | Xxxx | Yes |
| 6 | 24 | 7 | 0.5 | 125 | 1000 | 11% | 5% | 20 | 43.25 | Xxxx | Yes |
| 7 | 24 | 7 | 0.5 | 125 | 1000 | 11% | 5% | 0 | 39 | Xxxx | Yes |
| 8 | 48 | 7.5 | 0.5 | 100 | 1000 | 9% | 4% | 0 | 104 | Xxxx | Yes |
| 9 | 48 | 7.5 | 0.5 | 100 | 1000 | 9% | 4% | 20 | 51.9 | Xxxx | Yes |
| 10 | 48 | 4.5 | 0.125 | 60 | 600 | 9% | 4% | 0 | 64.75 | Xxxx | Yes |

[a]Mv is the mean diameter of the volume (average particle size).

TABLE 2

Repeat of tests in Table 1.

| Sample # | Milling Time (hrs.) | Media Wt. (kg) | Media Dia. (in.) | BN Powder Wt. (grams) | Water Wt. (mls) | Wt % Solids | Vol % Solids | Rohm & Hass Duramax 3019 Dispersant Wt. (grams) | BET Surface Area (m²/g) | Particle Size Mv (microns) | Acid Wash | $B_2O_3$ Wt % | $O_2$ Wt % | Thickness (nm) | Aspect Ratio |
|---|---|---|---|---|---|---|---|---|---|---|---|---|---|---|---|
| AS0597 | 0 | NA | NA | NA | NA | NA | NA | NA | 8.1 | 6.11 | Yes | 0.14 | .05 | 113 | 54 |
| AS0599 | 8 | 5 | 0.5 | 125 | 1000 | 11% | 5% | 0 | 17.2 | 6.40 | Yes | 1.32 | 1.77 | 52 | 122 |
| AS0596 | 24 | 4.5 | 0.125 | 60 | 600 | 9% | 4% | 0 | 38.3 | 5.03 | Yes | 0.77 | 1.34 | 23 | 216 |
| AS0600 | 24 | 7 | 0.5 | 125 | 1000 | 11% | 5% | 0 | 36.7 | 5.03 | Yes | 0.77 | 1.24 | 24 | 207 |
| AS0598 | 48 | 7.5 | 0.5 | 100 | 1000 | 9% | 4% | 0 | 58.3 | 4.41 | Yes | 0.52 | 1.41 | 15 | 289 |

| Sample # | Milling Time (hrs) | D10[b] | D50[c] | D90[d] | Mv[a] | Mn[e] | Ma[f] | Calc SA[g] | Sd[h] | Lc (A)[i] | La (A)[j] | Graphitization Index |
|---|---|---|---|---|---|---|---|---|---|---|---|---|
| AS0597 | 0 | 3.354 | 5.713 | 9.328 | 6.112 | 3.825 | 5.224 | 1.149 | 2.297 | 160 | 220 | 0.452 |
| AS0599 | 8 | 3.294 | 5.980 | 9.979 | 6.397 | 3.738 | 5.341 | 1.123 | 2.589 | 140 | 250 | 0.410 |
| AS0596 | 24 | 2.647 | 4.694 | 7.828 | 5.033 | 2.866 | 4.205 | 1.427 | 2.007 | 220 | 320 | 0.352 |
| AS0600 | 24 | 3.041 | 4.825 | 7.257 | 5.033 | 3.536 | 4.490 | 1.336 | 1.618 | 200 | 300 | 0.417 |
| AS0598 | 48 | 2.240 | 4.140 | 6.894 | 4.409 | 2.292 | 3.623 | 1.656 | 1.788 | 200 | 250 | 0.303 |

[a]Mv is the mean diameter of the volume (average particle size).
[b]D10 = 10% of the volume is smaller than the indicated size.
[c]D50 = 50% of the volume is smaller than the indicated size.
[d]D90 = 90% of the volume is smaller than the indicated size.
[e]Mn = mean number
[f]Ma = mean diameter of the area.
[g]calc. SA = calculated surface area - spherical particle by microtrac.
[h]Sd = standard deviation of particle size distribution
[i]Lc = thickness (see FIG. 1) (by X-ray diffraction).
[j]La = diameter (by X-ray diffraction)

Analysis of this data indicated that the Lc as reported by Hagio is not the appropriate measure of particle size, shape, and surface area. Instead, by measuring size by laser scattering and confirming by scanning electron microscopy, one can see that milling as described produces a high surface area powder by delamination of BN platelets. The increase in surface area is linearly correlated with the input of milling energy (time). The delamination milling results in a minor change in particle diameter as measured by laser scattering technique.

Example 3
Analysis of BN Powders as an Extrusion Aid

U.S. Pat. No. 5,688,457 to Buckmaster et al., which is hereby incorporated by reference, reports that certain foam cell nucleating agents including boron nitride, when added to thermoplastic polymers, significantly extend the maximum extrusion rate before the onset of gross melt fracture. Buckmaster teaches that such powders are preferably in the range of 0.001 to 5 wt % and have particle sizes of between about 0.5 μm to 20 μm. Buckmaster also teaches that BN particles less than 5 μm, and usually in the range of about 2–5 μm, are preferred over larger BN particles. Yip et al., "The Effect Of The Boron Nitride Type And Concentration On The Rheology And Processability Of Molten Polymers," ANTEC 1999, Tech. Papers, 45, New York (1999) ("Yip"), which is hereby incorporated by reference, examined the effect of different BN types on such processing, and taught that: a) agglomerated powders are undesirable; b) powders having high oxygen and/or $B_2O_3$ (such as about 5 wt % O2 and 2 wt % $B_2O_3$) are undesirable; and c) powders having good dispersability are desirable.

In an effort to further understand the dynamics of BN as an extrusion aid for polymer processing, the usefulness of the powders presented in Table 3 below was examined under substantially the same extrusion line presented in Buckmaster and Yip. In particular, the affect of changing characteristics of the BN powder on the maximum shear rate at the onset of gross melt fracture ("GMF") was studied.

Although the invention has been described in detail for the purpose of illustration, it is understood that such detail is solely for that purpose, and variations can be made therein

TABLE 3

Powders examined for use as an extrusion aid for polymer processing.

| AS #[a] | Max. Shear @ GMF (1/sec) | $O_2$ (wt %) | $B_2O_3$ (wt %) | BN Heat Treat Temp (° C.) | SEM Crystallite Size (microns) attached | Microtrac Data ($\mu m$) | | | | BET[f] SA ($m^2/g$) |
|---|---|---|---|---|---|---|---|---|---|---|
| | | | | | | Mv[b] | D10[c] | D50[d] | D90[e] | |
| 0427 | 155 | 1.8 | 0.42 | 1350 | ~1.5 | 3.606 | 0.214 | 1.948 | 8.969 | 20 |
| 0428 | 617 | 2.6 | 0.7 | 1350 | ~1.5 | 1.438 | 0.912 | 0.998 | 3.302 | 26 |
| 0429 | 155 | 1.8 | 0.1 | 1350 | ~1.5 | 1.097 | 0.188 | 0.871 | 2.428 | 31 |
| 0430 | 155 | 2.9 | 0.6 | 1325 | 0.5 | 6.159 | 0.755 | 3.192 | 17.17 | 31 |
| 0431 | 1080 | 2.2 | 0.8 | 2100 | ~4 | 3.726 | 2.026 | 3.545 | 5.6 | 65 |
| CTF5 | 925 | 0.3 | 0.02 | 2100 | ~7 | 6.285 | 3.261 | 5.753 | 9.937 | 8 |
| CTUF | 155 | ~5 | ~2 | 1325 | 0.5 | | | ~4–6 | | |
| CTL40 | 93 | 0.2 | 0.02 | 2100 | ~7 | | | Agg | | 65 |

[a]AS# = analytical sample number.
[b]Mv is the mean diameter of the volume (average particle size).
[c]D10 = 10% of the volume is smaller than the indicated size.
[d]D50 = 50% of the volume is smaller than the indicated size.
[e]D90 = 90% of the volume is smaller than the indicated size.
[f]BET = BET surface area measured on Micromeritics machine.

Analysis of Table 3 led to a number of conclusions. First, use of the high aspect ratio powder of the present invention leads to the highest shear rate before the onset of gross melt fracture. Moreover, the two powders which performed best were those which were heat treated at high temperatures. As discussed above, these high fired powders have highly ordered hexagonal lattices. The surfaces of these materials generally do not have any functional groups adhering thereon (i.e., they are chemically clean). It is possible that the cleanliness of these surfaces leads to lower friction. Therefore, when using BN as a processing aid, it is desirable to use a BN powder having a highly order hexagonal lattice.

The best performing powder, AS431, was highly delaminated. Such a thin particle has a low profile, which may be preferable if the mechanism for reducing pressure drop is die deposition. Moreover, such a low profile wall, when deposited on the die wall, may be more adherent because of reduced drag. Therefore, when using BN as a processing aid, it is desirable to use a BN powder having a high aspect ratio, such as the powders of the present invention.

High $B_2O_3$ residual content (more than about 20 ppm) may enhance particle dispersion within the melt (in the manner analogously described by Buckmaster for calcium tetraborate and organic acid salts). Of note, this finding apparently contradicts Yip's conclusion that $O_2/B_2O_3$ is undesirable. Therefore, when using BN as a processing aid, it is desirable to use a BN powder having at least 0.5 wt % $B_2O_3$.

The prior art conclusion that fine particle size is important is not at all supported by Table 3.

Although the high surface area powder performed the best, the powder with the lowest surface area (CFT5) was the second best powder. Therefore, it does not appear that surface area per se is a large factor in determining the utility of a BN processing aid powder.

Therefore, high fired BN powders having a high aspect ratio and possibly a minimum $B_2O_3$ content are the most desirable polymer extrusion aids.

by those skilled in the art without departing from the spirit and scope of the invention which is defined by the following claims.

What is claimed:

1. A powder comprising hexagonal boron nitride platelets having an aspect ratio of from about 50 to about 300.

2. The powder according to claim 1, wherein the platelets have a surface area of at least about 20 $m^2/g$.

3. The powder according to claim 2, wherein the platelets have a surface area of at least about 40 $m^2/g$.

4. The powder according to claim 3, wherein the platelets have a surface area of at least about 60 $m^2/g$.

5. The powder according to claim 1, wherein the platelets have a characteristic diameter greater than about 1 micron.

6. The powder according to claim 1, wherein the platelets have a $D_{10}$ diameter of between about 1 $\mu m$ and about 2.5 $\mu m$.

7. The powder according to claim 1, wherein the platelets have a thickness of no more than about 50 nm.

8. The powder according to claim 1, wherein the powder has a crystallization index of at least 0.15.

9. The powder according to claim 1, wherein the powder comprises no more than about 500 ppm $B_2O_3$.

10. The powder according to claim 1, wherein the powder comprises at least about 0.5 wt % $B_2O_3$.

11. A method of making delaminated hexagonal boron nitride powder comprising:

providing hexagonal boron nitride powder, and milling the hexagonal boron nitride powder in a milling mixture under conditions effective to produce delaminated hexagonal boron nitride powder having an aspect ratio of from about 50 to about 300.

12. The method according to claim 11, wherein said providing comprises high fire treating raw boron nitride powder.

13. The method according to claim 11, wherein the hexagonal boron nitride powder has a crystallization index of at least 0.15.

14. The method according to claim 11, wherein the hexagonal boron nitride powder is from about 5 wt % to about 30 wt % of the milling mixture.

15. The method according to claim 11, wherein the milling mixture comprises a milling media and a milling liquid.

16. The method according to claim 15, wherein the milling media is zirconia, steel balls, alumina, silicon nitride, silicon carbide, boron carbide, calcium oxide, or magnesium oxide.

17. The method according to claim 15, wherein the milling media has an average diameter of from about 1 mm to about 20 mm.

18. The method according to claim 15, wherein the milling liquid is any liquid in which $B_2O_3$ is soluble.

19. The method according to claim 15, wherein the milling liquid is water, methanol, ethanol, propanol, butanol, isomers of low molecular weight alcohols, acetone, or supercritical $CO_2$.

20. The method according to claim 15, wherein the milling liquid is from about 70 wt % to about 90 wt % of the milling mixture.

21. The method according to claim 11 further comprising; adding a dispersant to the milling mixture.

22. The method according to claim 11 further comprising:
adding from about 1 wt % to about 20 wt % alcohol to the milling mixture.

23. The method according to claim 11, wherein the milling is carried out for about 8 hours to about 48 hours.

24. The method according to claim 11, wherein the milling temperature is no more than about 30° C.

25. The method according to claim 11 further comprising:
dry milling the hexagonal boron nitride powder before or after said milling.

26. A polymer processing aid, comprising hexagonal boron nitride platelets having an aspect ratio of from about 50 to about 300 and a fluoropolymer.

27. A polymer composition, comprising:
a melt processable polymer and
a polymer processing aid comprising hexagonal boron nitride platelets having an aspect ratio of from about 50 to about 300 and a fluoropolymer.

* * * * *